(12) United States Patent
Kamble

(10) Patent No.: US 10,270,810 B2
(45) Date of Patent: Apr. 23, 2019

(54) DATA SOCKET DESCRIPTOR BASED POLICIES FOR APPLICATION AND DATA BEHAVIOR AND SECURITY

(71) Applicant: Avocado Systems Inc., San Jose, CA (US)

(72) Inventor: Keshav Govind Kamble, San Jose, CA (US)

(73) Assignee: AVOCADO SYSTEMS INC., San Jose, CA (US)

( * ) Notice: Subject to any disclaimer, the term of this patent is extended or adjusted under 35 U.S.C. 154(b) by 57 days.

(21) Appl. No.: 15/182,505

(22) Filed: Jun. 14, 2016

(65) Prior Publication Data

US 2016/0366186 A1 Dec. 15, 2016

Related U.S. Application Data

(60) Provisional application No. 62/175,331, filed on Jun. 14, 2015.

(51) Int. Cl.
*H04L 29/06* (2006.01)

(52) U.S. Cl.
CPC .............. *H04L 63/20* (2013.01); *H04L 63/06* (2013.01); *H04L 63/12* (2013.01); *H04L 63/1433* (2013.01)

(58) Field of Classification Search
USPC ............ 726/1, 2, 21, 36; 713/150, 163, 181; 380/255, 264, 276
See application file for complete search history.

(56) References Cited

U.S. PATENT DOCUMENTS

| | | |
|---|---|---|
| 6,694,434 B1 | 2/2004 | McGee et al. |
| 7,530,072 B1 | 5/2009 | Cheaz |
| 7,788,480 B2 | 8/2010 | Winget et al. |
| 7,895,642 B1 | 2/2011 | Larson et al. |
| 8,776,168 B1 | 7/2014 | Gibson et al. |
| 9,077,617 B1 | 7/2015 | Seth et al. |
| 9,094,407 B1 | 7/2015 | Matthieu et al. |
| 9,338,181 B1 | 5/2016 | Burns et al. |
| 9,349,015 B1 | 5/2016 | Archer et al. |
| 9,491,107 B1 | 11/2016 | Scudder et al. |
| 9,652,618 B1 | 5/2017 | Lerner |

(Continued)

OTHER PUBLICATIONS

Notice of Allowance from U.S. Appl. No. 15/182,544, dated Oct. 4, 2018.

(Continued)

*Primary Examiner* — Sharif E Ullah
(74) *Attorney, Agent, or Firm* — Zilka-Kotab, P.C

(57) ABSTRACT

In one embodiment, a system includes a processing circuit and logic integrated with and/or executable by the processing circuit. The logic is configured to cause the processing circuit to maintain application and data security policies at a data socket descriptor level. The logic is also configured to cause the processing circuit to manage behavior and security of data socket descriptors used by application instances executed on virtual and/or physical compute platforms. According to another embodiment, a method includes maintaining application and data security policies at a data socket descriptor level and managing behavior and security of data socket descriptors used by application instances executed on virtual and/or physical compute platforms.

14 Claims, 9 Drawing Sheets

(56) References Cited

U.S. PATENT DOCUMENTS

| | | | |
|---|---|---|---|
| 9,742,768 | B2 | 8/2017 | Cholas et al. |
| 9,952,790 | B2 | 4/2018 | Kamble |
| 9,954,578 | B2 | 4/2018 | Ehrensvard |
| 10,049,211 | B1 | 8/2018 | Lukacs et al. |
| 10,129,220 | B2 | 11/2018 | Kamble |
| 10,148,697 | B2 | 12/2018 | Kamble |
| 10,193,889 | B2 | 1/2019 | Kamble |
| 10,193,930 | B2 | 1/2019 | Kamble |
| 2003/0118185 | A1 | 6/2003 | Lambert |
| 2003/0140089 | A1 | 7/2003 | Hines et al. |
| 2004/0034767 | A1 | 2/2004 | Robinson et al. |
| 2006/0020814 | A1 | 1/2006 | Lieblich et al. |
| 2006/0069912 | A1 | 3/2006 | Zheng et al. |
| 2007/0028090 | A1 | 2/2007 | Lopez et al. |
| 2007/0033642 | A1 | 2/2007 | Ganesan et al. |
| 2007/0129015 | A1 | 6/2007 | Iwamoto et al. |
| 2007/0239761 | A1 | 10/2007 | Baio et al. |
| 2007/0250923 | A1 | 10/2007 | M'Raihi |
| 2008/0115203 | A1 | 5/2008 | Elzur |
| 2009/0019535 | A1 | 1/2009 | Mishra et al. |
| 2009/0172402 | A1 | 7/2009 | Tran |
| 2009/0185687 | A1 | 7/2009 | Wankmueller et al. |
| 2009/0228970 | A1 | 9/2009 | Morimoto |
| 2009/0328194 | A1 | 12/2009 | Kim et al. |
| 2010/0037295 | A1 | 2/2010 | Oh et al. |
| 2010/0228964 | A1 | 9/2010 | Booth |
| 2010/0275026 | A1 | 10/2010 | McLean |
| 2011/0173699 | A1 | 7/2011 | Figlin et al. |
| 2011/0302624 | A1 | 12/2011 | Chen et al. |
| 2011/0321172 | A1 | 12/2011 | Maeda et al. |
| 2012/0051314 | A1 | 3/2012 | Goyal et al. |
| 2012/0096510 | A1 | 4/2012 | Bentall |
| 2012/0173875 | A1 | 7/2012 | Mahidhara et al. |
| 2012/0311614 | A1 | 12/2012 | DeAnna et al. |
| 2013/0179061 | A1 | 7/2013 | Gadh et al. |
| 2013/0191905 | A1 | 7/2013 | Harada et al. |
| 2014/0036662 | A1* | 2/2014 | Takeshima ............ H04L 49/505 370/229 |
| 2014/0051432 | A1 | 2/2014 | Gupta et al. |
| 2014/0237545 | A1 | 8/2014 | Mylavarapu et al. |
| 2014/0380484 | A1 | 12/2014 | Choi et al. |
| 2015/0134965 | A1 | 5/2015 | Morenius et al. |
| 2015/0172153 | A1 | 6/2015 | Sharma et al. |
| 2015/0213237 | A1 | 7/2015 | Kruglick |
| 2016/0080399 | A1 | 3/2016 | Harris et al. |
| 2016/0191530 | A1 | 6/2016 | Jain et al. |
| 2016/0308904 | A1 | 10/2016 | Yoon et al. |
| 2016/0321452 | A1* | 11/2016 | Richardson ............ G06F 21/50 |
| 2016/0364163 | A1 | 12/2016 | Kamble |
| 2016/0366108 | A1 | 12/2016 | Kamble |
| 2016/0366142 | A1 | 12/2016 | Kamble |
| 2016/0366187 | A1 | 12/2016 | Kamble |
| 2016/0373485 | A1 | 12/2016 | Kamble |
| 2016/0381076 | A1 | 12/2016 | Kamble et al. |
| 2017/0006065 | A1 | 1/2017 | Kamble et al. |
| 2017/0019388 | A1 | 1/2017 | Kamble et al. |
| 2017/0039371 | A1 | 2/2017 | Lukacs et al. |
| 2017/0053120 | A1 | 2/2017 | Kamble et al. |
| 2017/0230414 | A1 | 8/2017 | Kamble |
| 2018/0069862 | A1 | 3/2018 | Cholas et al. |
| 2018/0089429 | A1 | 3/2018 | Kamble |

OTHER PUBLICATIONS

Non-Final Office Action from U.S. Appl. No. 15/243,854, dated Oct. 5, 2018.

Supplemental Notice of Allowance from U.S. Appl. No. 15/181,275, dated Oct. 17, 2018.

Kamble, K., U.S. Appl. No. 15/181,275, filed Jun. 13, 2016.

Non-Final Office Action from U.S. Appl. No. 15/181,275, dated Dec. 8, 2017.

Younis, A., "Socket Data structures and How the TCP protocol works," CS457, Fall 2014, pp. 1-18 retrieved from http://www.cs.colostate.edu/-gersch/cs457/CS457 tutorial2.pdf.

Hall, B., "Beej's Guide to Network Programming Using Internet Sockets," May 3, 2001, pp. 1-47 retrieved from http://www.cs.columbia.edu/-danr/courses/6761 /Fall00/hw/pa1 /6761-sockhelp.pdf.

Kamble, K., U.S. Appl. No. 15/181,304, filed Jun. 13, 2016.

Notice of Allowance from U.S. Appl. No. 15/181,304, dated Dec. 15, 2017.

Kamble, K., U.S. Appl. No. 15/182,544, filed Jun. 14, 2016.

Non-Final Office Action from U.S. Appl. No. 15/182,544, dated Mar. 16, 2018.

Kamble, K., U.S. Appl. No. 15/182,548, filed Jun. 14, 2016.

Non-Final Office Action from U.S. Appl. No. 15/182,548, dated Jun. 15, 2018.

Kamble, K., U.S. Appl. No. 15/184,956, filed Jun. 16, 2016.

Non-Final Office Action from U.S. Appl. No. 15/184,956, dated Mar. 30, 2018.

Kamble et al., U.S. Appl. No. 15/191,420, filed Jun. 23, 2016.

Non-Final Office Action from U.S. Appl. No. 15/191,420, dated Mar. 22, 2018.

Kamble et al., U.S. Appl. No. 15/197,635, filed Jun. 29, 2016.

Non-Final Office Action from U.S. Appl. No. 15/197,635, dated May 11, 2018.

Kamble et al., U.S. Appl. No. 15/210,828, filed Jul. 14, 2016.

Non-Final Office Action from U.S. Appl. No. 15/210,828, dated Jun. 13, 2018.

Kamble et al., U.S. Appl. No. 15/243,854, filed Aug. 22, 2016.

Kamble, K., U.S. Appl. No. 15/275,239, filed Sep. 23, 2016.

Non-Final Office Action from U.S. Appl. No. 15/275,239, dated May 16, 2018.

Kamble, K., U.S. Appl. No. 15/424,749, filed Feb. 3, 2017.

Notice of Allowance from U.S. Appl. No. 15/181,275, dated Jul. 16, 2018.

Du, W., "SYN-Cookies Exploration Lab," Syracuse University, 2006, pp. 1-3.

Final Office Action from U.S. Appl. No. 15/191,420, dated Aug. 14, 2018.

Supplemental Notice of Allowance from U.S. Appl. No. 15/181,275, dated Sep. 6, 2018.

Notice of Allowance from U.S. Appl. No. 15/184,956, dated Sep. 4, 2018.

Non-Final Office Action from U.S. Appl. No. 15/424,749, dated Sep. 19, 2018.

Kar et al., "Prevention of SQL Injection Attack Using Query Transformation and Hashing," 3rd Annual IEEE International Advance Computing Conference, 2013, pp. 1317-1323.

Notice of Allowance from U.S. Appl. No. 15/197,635, dated Nov. 14, 2018.

Corrected Notice of Allowance from U.S. Appl. No. 15/197,635, dated Dec. 10, 2018.

Final Office Action from U.S. Appl. No. 15/182,548, dated Jan. 15, 2019.

Final Office Action from U.S. Appl. No. 15/275,239, dated Jan. 18, 2019.

* cited by examiner

| 702 | 704 | 706 | 708 | 710 | 712 | 714 | 716 | 718 | 720 | 722 | 724 |
|---|---|---|---|---|---|---|---|---|---|---|---|
| Policy Name | Source IP | Dest IP (Optional) | Server Port | ID1 | ID2 | Base Signature | MTU | App. Buffer Size | Action | Sub-Action | Server Group |

| 802 | 804 | 806 | 808 | 810 | 812 | 814 | 816 | 818 | 820 | 822 | 824 |
|---|---|---|---|---|---|---|---|---|---|---|---|
| Policy Name | Source IP | Dest IP (Optional) | Server Port | ID1 (OP) | ID2 (OP) | Base Signature (OP) | MTU | App. Buffer Size | Action | Sub-Action | Server Group |

| 902 | 904 | 906 | 908 | 910 | 912 | 914 | 916 | 918 | 920 | 922 | 924 |
|---|---|---|---|---|---|---|---|---|---|---|---|
| Policy Name | Source IP | Dest IP (Optional) | Server Port | ID1 | ID2 | Security Profile Range | MTU | App. Buffer Size | Action | Sub-Action | Server Group |

DATA SOCKET DESCRIPTOR BASED POLICIES FOR APPLICATION AND DATA BEHAVIOR AND SECURITY

FIELD OF THE INVENTION

The present invention relates to network and system protection, and more particularly, this invention relates to data socket based policies.

BACKGROUND

Applications are made up of a large number of instructions and data. Instructions operate on data which is fetched in a cache and memory and is always unencrypted. Scaled-out, distributed applications are made up of a large number of application instances. These application instances have their own data in the cache and memory of the processor on which these applications run. A large number of such application instances communicate with each other and process data in parallel to create an aggregate output.

These types of scaled-out applications are extremely vulnerable to application breaches, data thefts from cache and memory by scraping, and other methods of illicitly obtaining data from the applications, cache, and/or memory. In data centers which cater to important applications and data types, such as Personally Identifiable Information (PII), Payment Card Industry (PCI) data, medical information that falls under Health Insurance Portability and Accountability Act (HIPAA), military and Government critical tasks, any application and/or data breach is very destructive and expensive to contain and/or resolve. Therefore, it is beneficial to attempt to prevent such breaches.

Typically, application security in data centers is attempted by applying policies and rules at various levels using security appliances installed in the data center. However, in spite of providing layers of security appliances to create a security perimeter around the data center, malware and malicious software still enters inside the servers in the data center to steal data and attack applications.

In most cases of data breaches, data and application instances that utilize flows in the East-West (E-W) direction, i.e., communication between servers and application instances inside of the data center, are attacked. This is different from North-South (N-S) flows which are protected by conventional data security appliances. Since the edge of the data center where all the servers are connected is considered the safest place, many times, applications communicate with each other in clear data without protecting the data. A huge amount of data is shared across applications and application tiers in the E-W direction within the data center.

SUMMARY

In one embodiment, a system includes a processing circuit and logic integrated with and/or executable by the processing circuit. The logic is configured to cause the processing circuit to maintain application and data security policies at a data socket descriptor level. The logic is also configured to cause the processing circuit to manage behavior and security of data socket descriptors used by application instances executed on virtual and/or physical compute platforms.

According to another embodiment, a method includes maintaining application and data security policies at a data socket descriptor level and managing behavior and security of data socket descriptors used by application instances executed on virtual and/or physical compute platforms.

In yet another embodiment, a computer program product includes a computer readable storage medium having program instructions stored thereon. The program instructions are executable by a processing circuit to cause the processing circuit to maintain application and data security policies at a data socket descriptor level. The program instructions are also executable by the processing circuit to cause the processing circuit to manage behavior and security of data socket descriptors used by application instances executed on virtual and/or physical compute platforms.

The embodiments described above may be implemented in any computing system environment known in the art, such as a networking environment, which may include a processor and a computer readable storage medium configured to store data and logic, the logic being implemented with and/or executable by the processor to cause the processor to perform one or more functions.

BRIEF DESCRIPTION OF THE DRAWINGS

The following descriptions of the drawings are not meant to be limiting on what is taught by the drawings in any manner. For a fuller understanding of the content of each drawing, the following brief descriptions are provided, which when read in conjunction with the detailed description, describe the full breadth of the various embodiments of the present invention.

FIG. 7 shows an East-West policy mapping, according to one embodiment.

FIG. 8 shows a North-South profile policy mapping, according to one embodiment.

FIG. 9 shows a security profile policy mapping, according to one embodiment.

DETAILED DESCRIPTION

Figure 1:
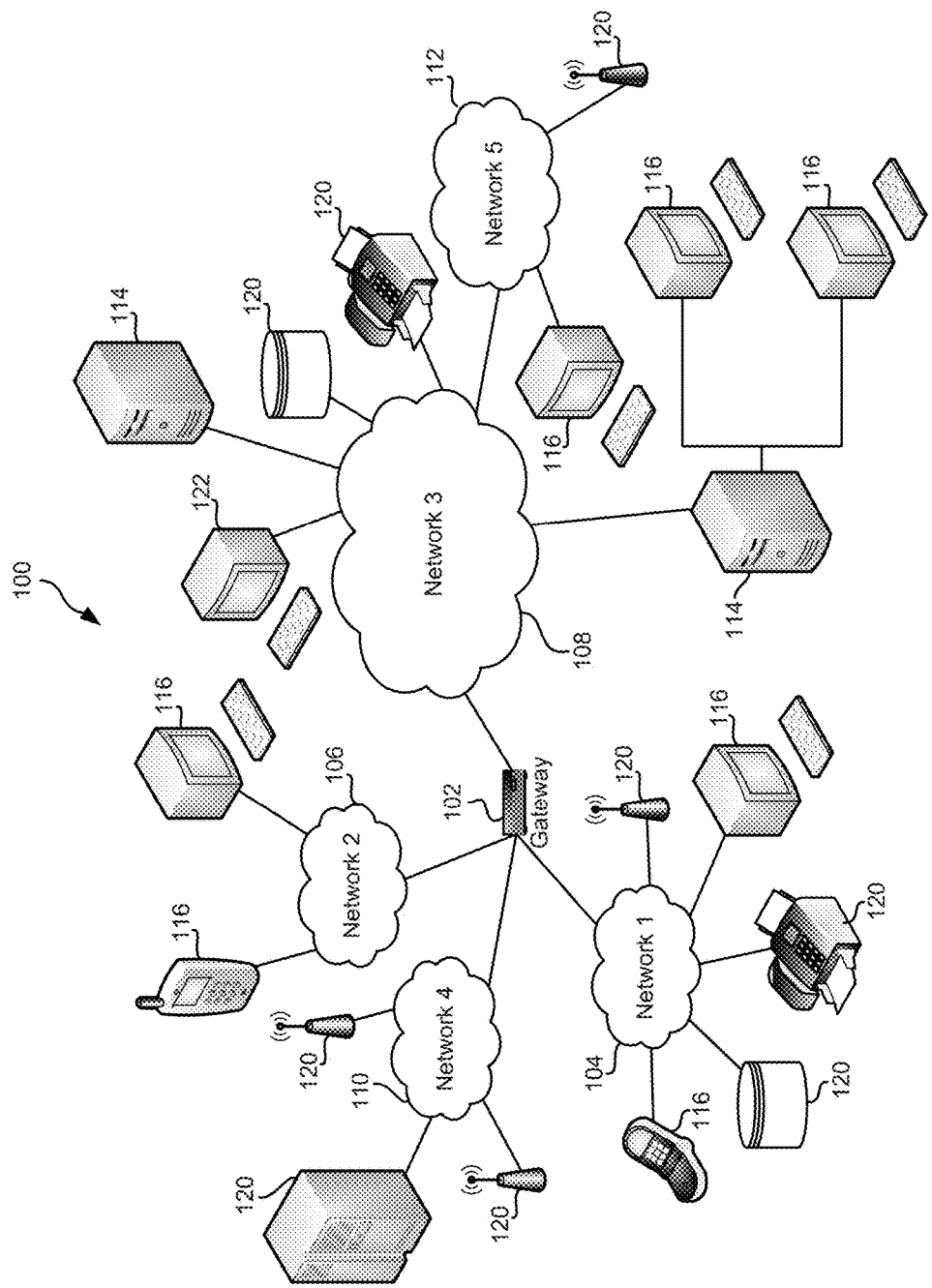
FIG. 1 shows a network architecture, according to one embodiment.

The descriptions presented herein are intended to enable any person skilled in the art to make and use the present invention and are provided in the context and requirements of particular applications of the present invention.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an," and "the" include plural referents unless otherwise specified.

Moreover, the term "about" when used herein to modify a value indicates a range that includes the value and less and greater than the value within a reasonable range. In the absence of any other indication, this reasonable range is plus and minus 10% of the value. For example, "about 10 milliseconds" indicates 10 ms±1 ms, such that the range includes all values in a range including 9 ms up to and including 11 ms.

Also, the term "comprise" indicates an inclusive list of those elements specifically described without exclusion of any other elements. For example, "a list comprises red and green" indicates that the list includes, but is not limited to, red and green. Therefore, the list may also include other colors not specifically described.

Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown and described herein, but is to be accorded the widest scope consistent with the principles and features disclosed herein.

In particular, various embodiments of the invention discussed herein may be implemented using a network, such as the Internet, to communicate among a plurality of computer systems. One skilled in the art will recognize that the present invention is not limited to the use of the Internet as a communication medium and that alternative methods of the invention may accommodate the use of a private intranet, a Local Area Network (LAN), a Wide Area Network (WAN), or other communication media. In addition, various combinations of wired (e.g., Ethernet), wireless (e.g., radio frequency) and optical communication links (e.g., fiber optic) may be utilized.

The term application as used herein refers to any type of software and/or hardware-based application, such as enterprise data center applications, Internet-of-Things (IOT) applications, Industrial control applications, military applications, etc.

Enterprise data center applications may include any of the following application types: financial applications, equity trading applications, healthcare applications, financial transaction applications, etc.

IOT applications may include any of the following application types: mobile communication applications, home automation/control applications, industrial automation/control applications, security and monitoring applications, etc.

Industrial control applications may include any of the following application types: nuclear power plant control, thermal power plant control, hydro-electric power plant control, wind farm control, electricity grid and distribution control, water treatment control, land-based traffic control, air traffic control, etc.

Military applications may include any of the following application types: military installation control, first alert system control, autoguided weapon system control, military weaponized equipment control including manned vehicles, weaponized and/or surveillance-oriented unmanned vehicle control (drones) such as unmanned aerial vehicles (UAVs), unmanned aircraft systems (UASs), unmanned underwater vehicles (UUVs), unmanned ground vehicles (UGVs), etc.

A program environment in which one embodiment may be executed illustratively incorporates one or more general-purpose computers and/or special-purpose devices, such as switches, routers, switch controllers, etc. Details of such devices (e.g., processor, memory, data storage, input devices, and output devices) are well known and are omitted for the sake of clarity.

It should also be understood that the techniques of the present invention may be implemented using a variety of technologies. For example, the methods described herein may be implemented in software running on a computer system, implemented in hardware utilizing one or more hardware processors and logic (hardware logic and/or software logic) implemented with and/or executable by the hardware processor. The logic is configured to cause the processor to perform operations of a method, and may take any form known to those of skill in the art, such as application specific integrated circuits (ASICs), programmable logic devices such as Field Programmable Gate Arrays (FPGAs), and/or various combinations thereof.

In one illustrative approach, methods described herein may be implemented by a series of computer-executable instructions stored to a computer readable storage medium, such as a physical (e.g., non-transitory) data storage medium. In addition, although specific embodiments may employ object-oriented software programming concepts, the present invention is not so limited and is adaptable to employ other forms of directing the operation of a processor.

The present invention may also be provided in the form of a computer program product comprising a computer readable storage medium having program instructions thereon or a computer readable signal medium having program instructions therein, which may be executed by a computing device (e.g., a processor) and/or a system. A computer readable storage medium may include any medium capable of storing program instructions thereon for use by a computing device or system, including optical media such as read only and writeable CDs and DVDs, magnetic memory or media (e.g., hard disk drive, magnetic tape, etc.), semiconductor memory (e.g., FLASH memory, non-volatile random access memory (NVRAM), and other non-volatile storage media known in the art), firmware encoded in a microprocessor, etc.

A computer readable signal medium is one that does not fit within the aforementioned computer readable storage medium definitions. For example, illustrative computer readable signal media communicate or otherwise transfer transitory signals within a system, between systems, etc., e.g., via a physical or virtual network having a plurality of connections.

FIG. 1 illustrates an architecture 100, in accordance with one embodiment. As an option, the present architecture 100 may be implemented in conjunction with features from any other embodiment listed herein, such as those described with reference to the other figures. Of course, however, such architecture 100 and others presented herein may be used in various applications and/or in permutations which may or may not be specifically described in the illustrative embodiments listed herein. Further, the architecture 100 presented herein may be used in any desired environment.

As shown in FIG. 1, a plurality of remote networks are provided including a first remote network 104 and a second remote network 106. A gateway 102 may be coupled between the remote networks 104, 106 and a proximate network 108. In the context of the present network architecture 100, the networks 104, 106 may each take any form including, but not limited to, a LAN, a WAN such as the Internet, a storage area network (SAN), a public switched telephone network (PSTN), an internal telephone network, etc. Additional networks 110, 112 may also be connected via the gateway 102 or some other connection device known in the art. These networks may be of a different type than the networks 104, 106. For example, network 110 may be a network devoted to the IOT, and may provide infrastructure and protocols for communication between all devices in the IOT, and between any devices in the IOT and the networks 104, 106. In another example, network 112 may be a network devoted to Industrial control, and may provide infrastructure and protocols for communication within and/ or between facilities anywhere in the world, including automated devices, manufacturing lines, assembly lines, processing control software, etc.

In use, the gateway 102 serves as an entrance point from the remote networks 104, 106 to the proximate network 108. As such, the gateway 102 may function as a router, which is capable of directing a given packet of data that arrives at the gateway 102, and a switch, which furnishes the actual path in and out of the gateway 102 for a given packet.

Further included in the network architecture 100 is at least one data server 114 coupled to the proximate network 108, and which is accessible from the remote networks 104, 106 via the gateway 102. It should be noted that the data server(s) 114 may include any type of computing device/ groupware. Coupled to each data server 114 is a plurality of user devices 116. User devices 116 may include any device known by those of skill in the art, such as a desktop computer, a laptop computer, a hand-held computer, a smartphone, a terminal, a port, a printer, some type or form of logic, etc. It should be noted that a user device 122 may also be directly coupled to any of the networks, in one embodiment.

A peripheral 120 or series of peripherals 120, e.g., facsimile machines, printers, networked storage units, hard disk drives, wireless routers, etc., may be coupled to one or more of the networks 104, 106, 108, 110, 112. It should be noted that databases, servers, mainframes, and/or additional components may be utilized with and/or integrated into any type of network element coupled to the networks 104, 106, 108, 110, 112. In the context of the present descriptions, a network element may refer to any component of a network, system, device, and/or any device useable in a network.

According to some approaches, methods and systems described herein may be implemented with and/or utilized on virtual systems and/or systems which emulate one or more other systems, such as a UNIX system which emulates a MAC OS environment, a UNIX system which virtually hosts a MICROSOFT WINDOWS environment, a MICROSOFT WINDOWS system which emulates a MAC OS environment, etc. This virtualization and/or emulation may be enhanced through the use of virtualization software, such as VMWARE ESX, MICROSOFT HYPER-V, SIMICS, etc., in some embodiments.

In more approaches, one or more of the networks 104, 106, 108, 110, 112 may represent a cluster of systems commonly referred to as a "cloud." In cloud computing, shared resources, such as processing power, peripherals, software, data processing, servers, storage, etc., are provided to any system that has access to the cloud and permission to access the specific resource, preferably in an on-demand relationship, thereby allowing access and distribution of services across many computing systems. Cloud computing typically involves an Internet or other high speed connection (e.g., 4G LTE, fiber optic, etc.) between the systems operating in the cloud, but other techniques of connecting the systems may also be used as would be understood by those of skill in the art.

Figure 2:
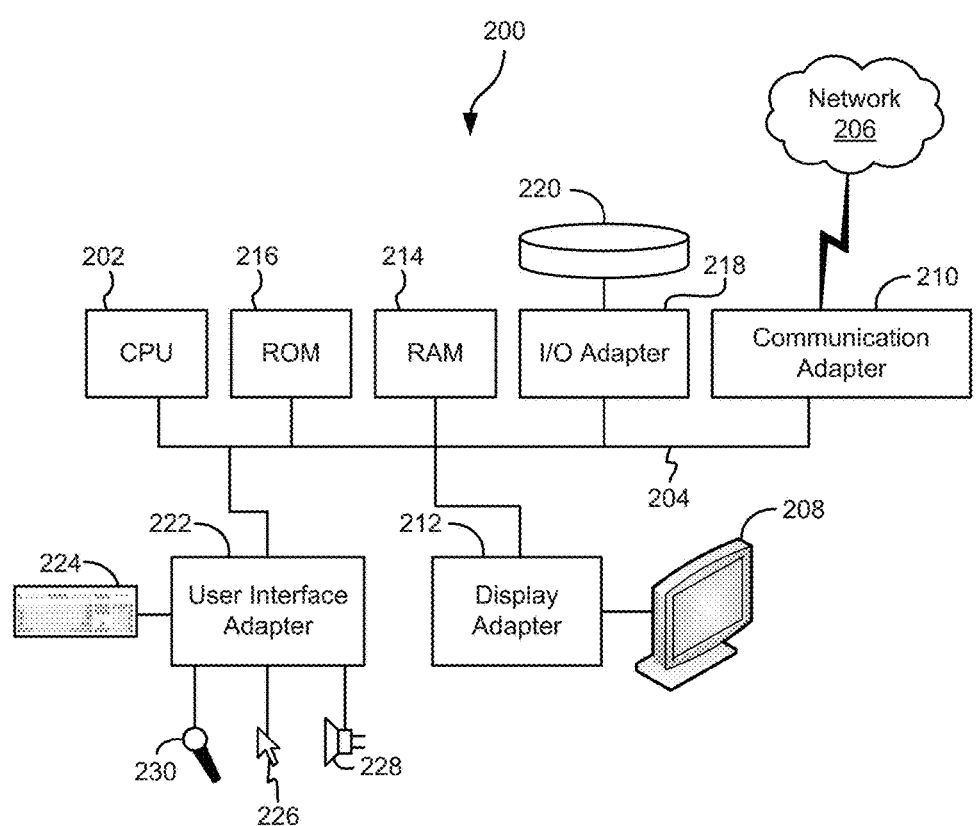
FIG. 2 shows a hardware environment that may be associated with the network architecture of FIG. 1, according to one embodiment.

FIG. 2 shows a representative hardware environment associated with a user device 116 and/or a server 114 of FIG. 1, in accordance with one embodiment. FIG. 2 illustrates a typical hardware configuration of a workstation 200 having a central processing unit 202, such as a microprocessor, and a number of other units interconnected via a system bus 204.

The workstation 200 shown in FIG. 2 includes a Random Access Memory (RAM) 214, Read Only Memory (ROM) 216, an I/O adapter 218 configured to connect peripheral devices, such as disk storage units 220 to the bus 204, a user interface adapter 222 configured to connect a keyboard 224, a mouse 226, a speaker 228, a microphone 230, and/or other user interface devices such as a touch screen, a digital camera, etc., (not shown) to the bus 204, communication adapter 210 configured to connect the workstation 200 to a communication network 206 (e.g., a data processing network) and a display adapter 212 configured to connect the bus 204 to a display device 208.

The workstation 200 may have resident thereon an operating system, such as the MICROSOFT WINDOWS Operating System (OS), a MAC OS, a UNIX OS, etc. It will be appreciated that a preferred embodiment may also be implemented on platforms and operating systems other than those specifically mentioned herein. A preferred embodiment may be written using JAVA, XML, C, and/or C++ language, SCALA, COBOL, FORTRAN, or other programming languages, along with an object oriented programming methodology or scripting language such as PERL, PYTHON, Tcl/Tk, or other scripting languages. Object oriented programming (OOP), which has become increasingly used to develop complex applications, may also be used.

Moreover, one or more hardware processors may be implemented in a processing circuit in the workstation 200. The processing circuit includes the one or more hardware processors, along with any connections or links therebetween necessary to interconnect the one or more processors in the processing circuit. In addition, the processing circuit may be implemented with logic and/or may be configured to execute logic, with the logic being configured to cause the processing circuit to perform functionality specified by the logic.

Figure 3:
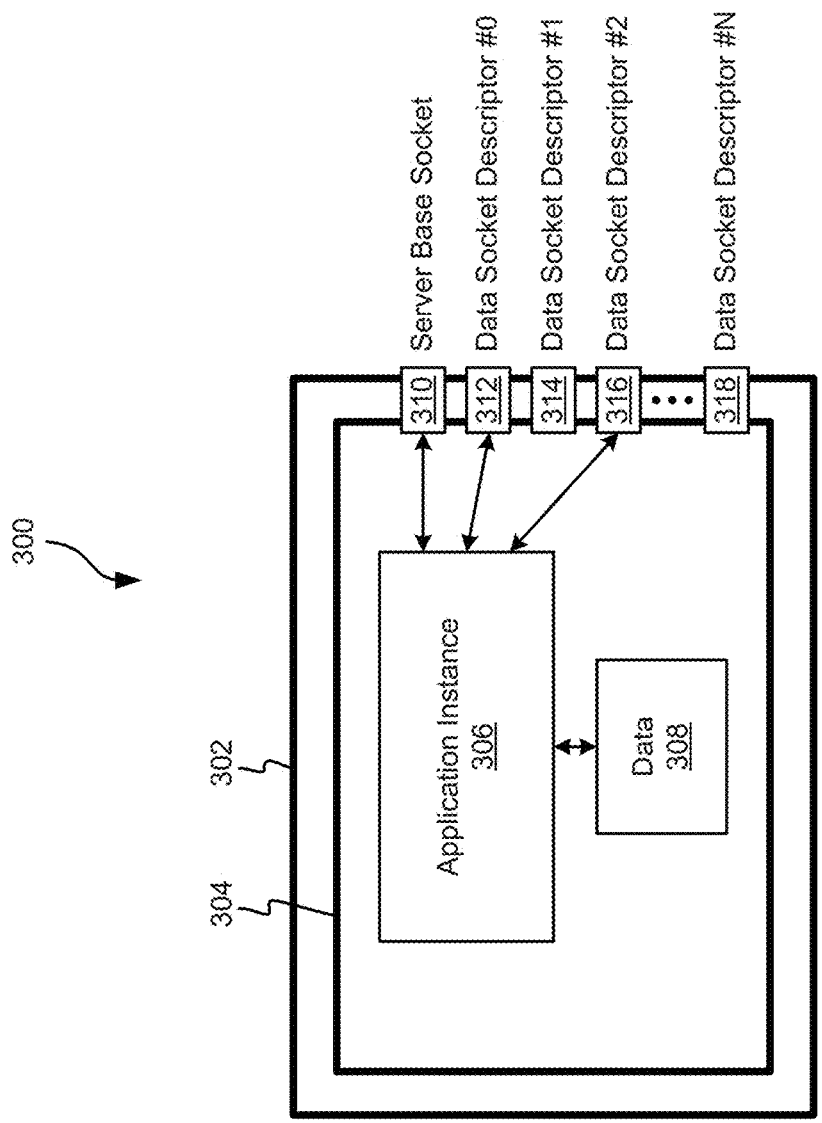
FIG. 3 shows a logical representation of an application instance operating on a computing system, in accordance with one embodiment.

Now referring to FIG. 3, a logical representation of an application instance 306 operating on a computing system 300 is shown according to one embodiment. Although only one application instance 306 and one set of data 308 is shown in FIG. 3, as would be understood by one of skill in the art, any number of application instances and groups of data may be hosted on a computing system 300, limited only by the processing power and/or other resources available to the computing system 300.

As shown in FIG. 3, an application protection layer (APL) 302 and a data protection layer (DPL) 304 are represented within the computing system 300, according to one embodiment. The application instance 306 has access to data 308 within the computing system 300. Also, the application instance 306, through any number of standard and/or custom application programming interfaces (APIs), may utilize any of a plurality of data socket descriptors e.g., data socket descriptor #0 312, data socket descriptor #1 314, data socket descriptor #2 316, . . . , data socket descriptor #N 318) with which to communicate (send and/or receive) formation outside of the application instance 306 or computing system 300. One or more server base sockets 310 is provided in the application instance 306 of computing system 300 and is used for control of the peer application instances on the computing system 300, outside the system, or outside the application instance 306 itself, as would be understood by one of skill in the art.

In order to provide application and data protection to application instances of distributed, scaled-out applications which have instances operating on a plurality of computing systems, at least two operations may be performed, and are described below according to one embodiment.

In a first operation, application instances, such as application instance 306, are identified based upon data socket descriptor attributes that an application instance uses to communicate between other application instances and/or group(s) of application instances on/or outside of the computing system 300. For example, in response to application instance 306 utilizing data socket descriptor #0 312 consistently to communicate with another system, an association may be established between data socket descriptor #0 312 and the application instance 306. By consistently, what is meant is that application instance 306 utilizes data socket descriptor #0 312 to communicate with another system more than a predetermined number of times within a given period of time, according to one embodiment. In another embodiment, consistently utilizing a data socket descriptor means that only a specific data socket descriptor is used in exclusion of all others over a given period of time.

In a second operation, a group is formed which includes any application instance which has all of the same socket descriptor attributes (or at least a predetermined amount of the same socket descriptor attributes, or the same of a certain group of socket descriptor attributes), e.g., data exchange sockets of the same application base socket, transport protocol, server port, various multi-tenancy characteristics, storage characteristics, payload sizes, container attributes, and/or multiple time contexts are grouped together.

Any socket descriptor attributes may be considered when determining whether an application instance shares data socket descriptor attributes with another application instance, such as OS and container attributes which include server port, transport protocol, network address translation (NAT) IP address range, maximum transmission unit (MTU), application payload sizes, user programmable attributes such as multi-tenancy labels etc.

Using the above two operations, two layers of protection (application protection and data protection) are enacted together to protect the application (not shown) from which the application instance 306 is provided and any group of application instances related to the application that provides the application instance 306.

The APL 302 works with data socket APIs and data socket libraries to provide protection to application instances and to the data that is used by the application instances. While doing so, the APL 302 does not interfere with the application architecture and its normal behavior. Though these new APIs, each application instance receives extra capabilities to ensure that all flows entering and exiting the application instance are trusted flows. Moreover, the APL 302 receives additional infrastructural help by being informed about the security status of virtual and/or physical servers on which the application instance is running, along with the security status of other application instances and their virtual and/or physical servers. Based on the comprehensive status of the servers and network in the data center, the APIs provide feedback and suggest use of data protection mechanisms to protect data in memory and cache.

FIG. 3 shows the Application and Data Protection Layer (ADPL) libraries which keep track of the server base socket 310 and various data socket descriptors 312, 314, 316, . . . , 318 opened by an application instance 306 for communication of data with one or more peer applications outside of the computing system 300. The data socket descriptors 312, 314, 316, . . . , 318 are used for the exchange of data with another system outside of the computing system 300.

The data socket descriptors 312, 314, 316, . . . , 318 are numbers that represent attributes and/or characteristics of different data exchanges between the application instance and one or more receiver hosts. Each data socket descriptors 312, 314, 316, . . . , 318 may have a size ranging from 12 to 48 bits, such as 32 bits in one embodiment.

Each of the APL 302 and the DPL 304 utilize individual sets of APIs that are configured to piggyback on existing APIs, but add specialized functionality to any action performed using the existing APIs.

These new socket APIs and data protection APIs, and the type of application payload sent and received, do not disturb the intermediate security appliances such as firewall, Intrusion Prevention and Intrusion Detection, etc.

The application instance 306 utilizes the one or more server base socket(s) 310 with standard and/or private well-known port number(s) as a control socket, but opens a new data socket descriptor and allocates a different port number to the new data socket descriptor in order to handle actual functionality and data transfer between the computing system 300 and any other external or peer system.

ADPL library functions may be used by the application instance 306 to send and receive data using operating system data sockets 312, 314, 316, . . . , 318. ADPL library functions may add all security mechanisms around the socket APIs. Modules in the ADPL architecture include: a security policies database which includes secure application policies specific to E-W policies and N-S policies, and secure data policies. Additional modules include a socket descriptor database, packet processing functions, a management process, and a configuration and logging mechanism.

The ADPL uses micro-security policies with which to secure the application instance 306 and the data 308. Every ingress packet on a selected data socket descriptor (e.g., data socket descriptor #2 316) is verified against the micro-security policies. Security policies are defined as operands, actions/operations, and sub-actions.

There are two types of application security policies applied by the APL 302: E-W Policies and N-S Policies, E-W Policies dictate and limit data socket use in communications with other data sockets and/or servers within the data center. N-S Policies dictate behavior of data sockets that communicate between servers within the data center and hosts and/or servers outside the data center.

Data security policies refer to complex data-type centric policies. These policies are triggered by the security profile of the data socket based on the data socket descriptor on which data is exchanged. Based on the security profile, the data exchange is allowed, restricted, or limited. The security profile is derived from the packet options which are available via data socket options, in one embodiment.

Figure 4:
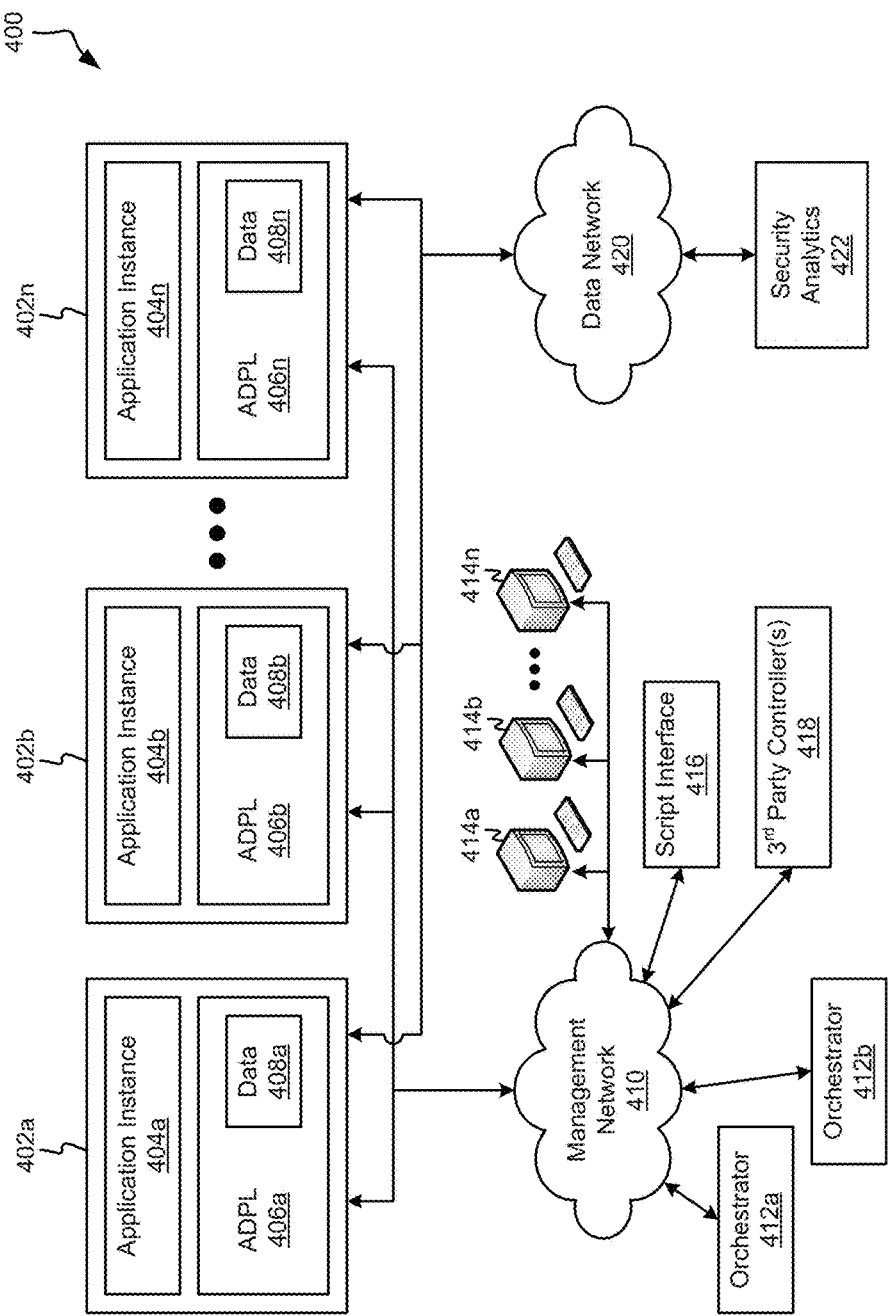
FIG. 4 shows an application and data protection library (ADPL) control model implemented in a data center, according to one embodiment

FIG. 4 shows the ADPL control model implemented in a data center 400, according to one embodiment. As shown, one or more policy orchestrators 412a, 412b is associated with the management network 410. More than one policy orchestrator may be utilized in high availability (HA) mode. Each policy orchestrator 412a, 412b may include segment management, policies management, configuration management, application tracking, a security trending controller, and software defined control.

From the management network 410, APIs, such as representational state transfer (REST) APIs (among others known in the art), may be distributed to the plurality of management consoles 414a, 414b, . . . , 414n, the scripted interface 416, and/or to one or more third party controllers 418. Each of the plurality of management consoles 414a, 414b, . . . , 414n may include a graphical interface, REST API-based programmability, trending, analysis, auditing, and third party controller integration.

One or more virtual platforms 402a, 402b, . . . , 402n host one or more ADPL-shielded application instances 404a, 404b, . . . , 404n along with data 408a, 408b, . . . , 408n utilized by each application instance 404a, 404b, . . . , 404n which are protected by ADPLs 406a, 406b, . . . , 406n.

The primary policy orchestrator 412a communicates to the one or more ADPL-shielded application instances 404a, 404b, . . . , 404n through the management network 410. Each of the ADPLs 406a, 406b, . . . , 406n operating for each individual application instance 404a, 404b, . . . , 404n may include application protection and policy enforcement, data protection and policy enforcement, and collection of statistics of normal and malicious behavior.

The data network 420 is associated with a security analytics module 422 which may include a security analytics engine and a collection of security analysis tools. In more approaches, the security analytics module 422 may include Fire Eye Sandbox, and/or other third party security analysis tools, from third parties such as IBM, CISCO, SYMANTEC, MCAFEE, etc. Moreover, the security analytics module 422 may provide feedback to the one or more policy orchestrators 412a, 412b.

One or more of the application instances 404a, 404b, . . . , 404n may be grouped together in picosegments or groups that each include related socket descriptors and data socket descriptors of application instances that share characteristics based on data socket descriptors, among other characteristics. The policy orchestrator 412a, 412b interacts with the various picosegments of application instances in which ADPL-shielded application instances 404a, 404b, . . . , 404n are grouped together as a whole, rather than with each individual application instance individually.

Figure 5:
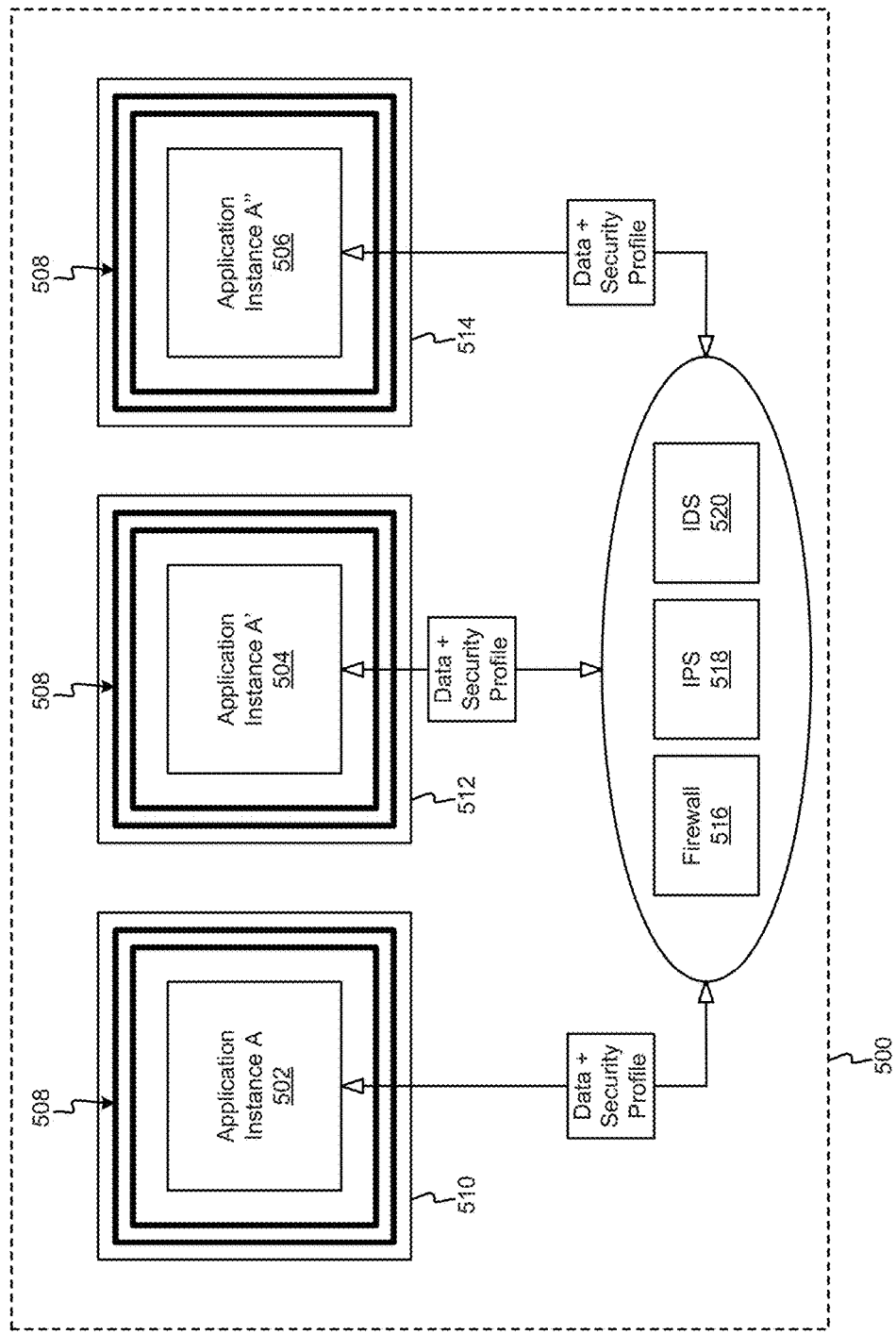
FIG. 5 shows several application instances operating in a virtual environment, according to one embodiment.

Now referring to FIG. 5, three instances of an application, Application instance A 502, Application instance A' 504, and Application instance A" 506 are shown running in a virtual environment 500 on one or more virtual platforms, such as hypervisors. An ADPL 508 provided by secure APIs called by the hosts, Host A 510, Host A' 512, and Host A" 514, enables application protection via policies and also provides data protection by sharing a security status and security profile with any peer application instances operating on other hosts (Application instance A 502 is a peer to Application instance A' 504, Application instance A' 504 is a peer to Application instance A" 506, Application instance A" 506 is a peer to Application instance A 502, and so forth). Using the security profile of the peer application instance, the protected application instance is provided the capability to apply various data security mechanisms to protect itself from malicious code and data breach attacks.

New socket APIs and data protection APIs that are utilized to provide the protection do not disturb any intermediate security appliances used in the network and/or on the servers or hosts, such as a firewall 516, an Intrusion Prevention System (IPS) 518, an Intrusion Detection System (IDS) 520, etc.

The ADPL 508 around the socket descriptors for applications which include database applications creates a mapping of security profile policies with the application per data socket descriptor to perform various security feature functionally, such as dynamic cache flush, dynamic data redaction, locking of in-memory database(s), etc. These security features are configured to be applied on a per application instance per session basis. As a result, a database server is allowed to enact a dynamic security feature depending upon the security profile of that particular session at that time, thereby avoiding cache scraping, data breaches, or other unwanted intrusion by malware or nefarious applications.

Figure 6:
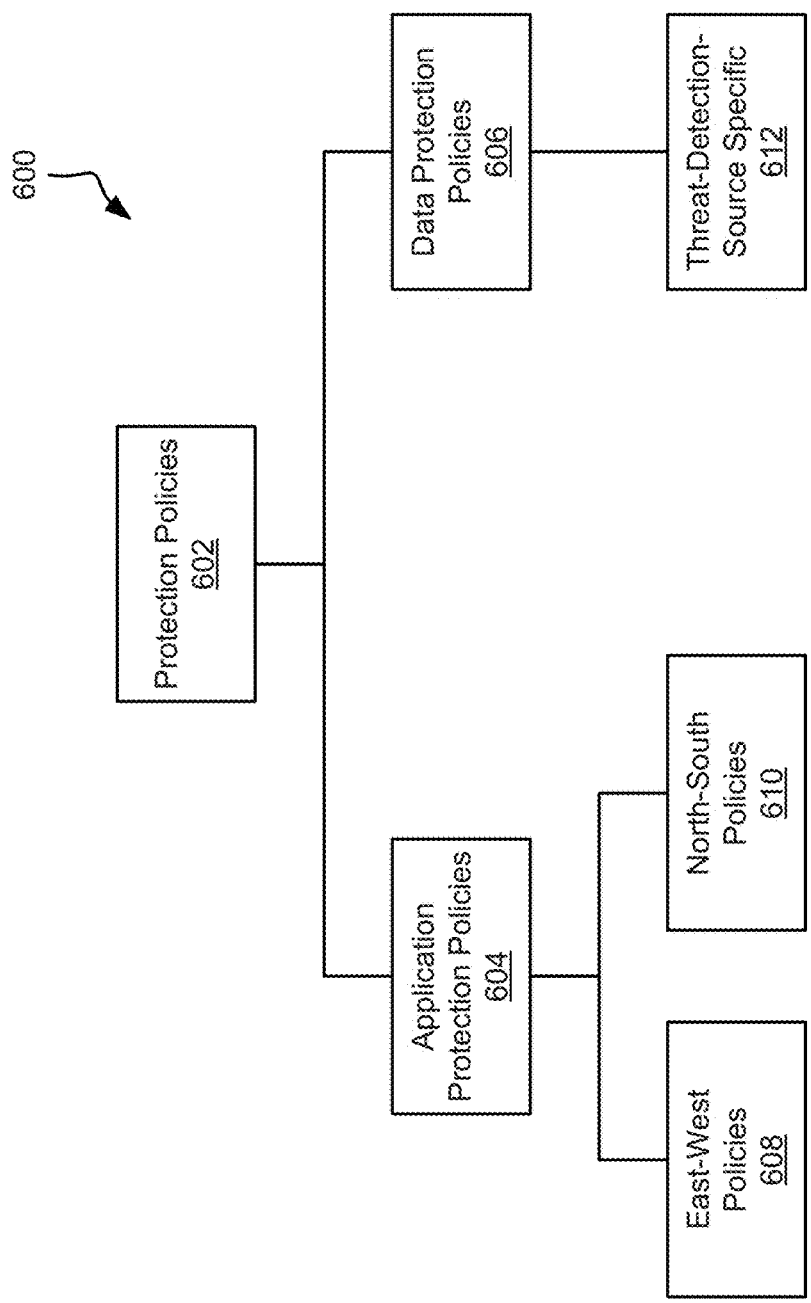
FIG. 6 shows organization for the data security policies in one approach.

The organization of the data security policies 600 is illustrated in FIG. 6 according to one embodiment. Protection Policies 602 are divided into two distinct categories: Application Protection Policies 604 and Data Protection Policies 606. Application Protection Policies 604 are further divided into the categories of East-West Policies 608 and North-South Policies 610. Data Protection Policies 606 are further categorized as Threat-Detection-Source specific 612. For all policies, a generic policy format is as follows: {{operands}, {actions}, [sub-actions], [params]}.

The operands include, according to one embodiment: Source IP address or SIP, Transport Protocol, ID1, ID2, Seed Policy Signature, MTU, and Application Transmission Buffer Size. The operands may further include, in some embodiments, one or more of Destination IP address or DIP and Server Port. SIP is the source IP address (e.g., sender's IP address), the DIP is the destination IP address (e.g., receiver's IP address), the Server Port is the base server port, the transport protocol is the protocol used in the transmission (e.g., TCP, UDP, Raw, etc.), Seed Policy Signature is the base secure source signature which acts as a seed to the secure source signature generator or key generator module for the security policy, MTU is the maximum transmission unit size, and Application Transmission Buffer Size is the size of the buffer the application uses to transmit messages on the selected data socket.

The actions are selected from the following list: allow, drop, allow_analyze, and drop_analyze. Specifically, allow indicates to allow the data exchange and keep statistics. Drop indicates to drop the data and keep statistics and log the event. Allow_analyze indicates to allow the data exchange, keep statistics, and send the payload for analysis. Drop_analyze indicates to keep statistics, log the event, and send the payload for analysis. The sub-actions are selected from a list that includes: Log, Trap, Event, RateLimit, and Mirror, among others not specifically disclosed herein but known in the art. The parameter values include the Rate Limit value.

East-West Policies 608 govern traffic between internal servers in the data center. Internal server subnet/IP addresses are provided by application administration. All East-West packets on individual data sockets are marked with a unique secure source signature. There is strict signature matching such that packets with mismatching or no signature are logged and dropped according to the actions dictated by the East-West Policies 608.

Referring now to FIG. 7, an E-W policy mapping 700 is shown according to one embodiment, which may be used by a dynamic security feature mechanism according to one embodiment. The fields included in the E-W policy mapping 700 include, but are not limited to, policy name 702, which indicates the name of the data security policy; source IP 704, which indicates the source of the interaction, e.g., the peer server IP address of the socket descriptor (per socket descriptor); destination IP 706, an optional field which indicates the IP address of the recipient; server port 708, which indicates the particular port on the server on which data is received or sent, e.g., application base port; ID1 710, which indicates a globally unique identification number given by the library mechanism for an entity (such as an enterprise, company, university, cit subdivision, etc.) that utilizes the ADPL mechanism in the application instances or programmed for proprietary purposes; ID2 712, which indicates a unique identification number within the entity (not necessarily globally unique) given by the library mechanism; base signature 714, which indicates a first received secure source signature in an exchange over a particular session on a data socket; MTU 716, which indicates a Maximum Transfer Unit of physical media; App. Buffer Size 718, which indicates a size of the buffer the application instance uses to send or receive data over this socket descriptor; action 720 which indicates one or more of a plurality of actions that may be performed, such as Allow, Allow-Analyze, Drop, Drop-Analyze, Rate-Limit, Mirror, etc.; sub-action 722, which indicates a further action that may be performed in addition to the action, such as Log, Trap, Event, etc.; and server group 724, which indicates the name of the application server group (also referred to as a picosegment) given by the application instance and/or ADPL.

Referring again to FIG. 6, North-South Policies 610 govern traffic between external clients and/or servers outside of the data center and internal servers within the data center. Data sockets governed by North-South Policies 610 allow packets without options or signatures.

FIG. 8 shows a N-S policy mapping 800 according to one embodiment. The only differences between the E-W policy mapping 700 of FIG. 7 and the N-S policy mapping 800 of FIG. 8 is that the ID1 810 field, the ID2 812 field, and base signature 814 field are optional fields that may or may not be present in the N-S policy mapping 800, according to various embodiments. However, the actions and sub-actions available are the same for N-S policy mapping 800 as for the E-W policy mapping 700 of FIG. 7, according to this embodiment. Referring again to FIG. 8, the N-S policy mapping 800 also includes policy name 802, source IP 804, optional destination IP 806, server port 808, MTU 816, App. Buffer Size 818, action 820 sub-action 822, and server group 824.

FIG. 9 shows a security profile policy mapping 900 that may be used by a dynamic security feature mechanism according to one embodiment. The fields included in the mapping 900 include, but are not limited to, policy name 902; source IP 904; destination IP 906; server port 908; ID1 910; ID2 912; security profile range 914, which indicates a determined risk range associated with the security profile; MTU 916; App. Buffer Size 918; action 920 which indicates one or more of a plurality of actions that may be performed, such as dynamic cache flush, data redaction, cache locking, in-memory locking, etc.; sub-action 922, which indicates a further action that may be performed in addition to the action, such as logging, trapping, triggering an event, mirroring, etc.; and server group 924.

Figure 10:
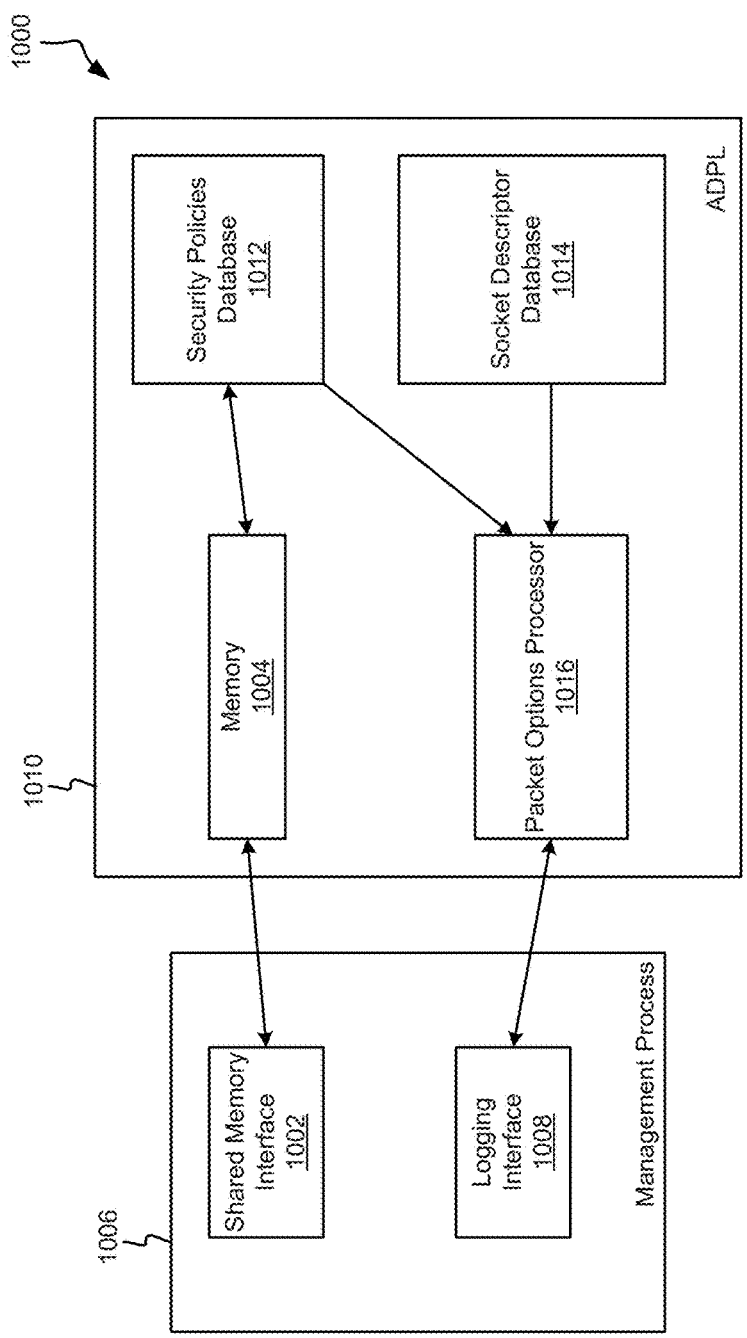
FIG. 10 shows the ADPL architecture according to one embodiment

Now referring to FIG. 10, the ADPL architecture 1000 is shown according to one embodiment. A shared memory interface 1002 (also referred to as a message queue) is used by inter-process communications (IPC) for multiple process communications to a memory 1004, which may be a shared memory in one embodiment. The shared memory interface 1002 is used to send and receive configuration and messages between the management process 1006 and ADPL libraries (target applications) 1010. The size of the memory 1004 is set to be of a size to ensure optimum messaging performance.

The logging interface 1008 utilizes the management process 1006 on one side and the ADPL 1010 on the other side. The management process 1006 is a message multiplexer. The management process 1006 may be configured to perform and/or maintain the following functionality:

1. Create and maintain a local log file.
2. Message queue to receive log messages from the ADPL library 1010.
3. When logging server is configured, send messages to the logging server.
4. When no logging server is configured, log to the local file.
5. Check log file size as per configuration sent by the policy orchestrator.

The ADPL 1010 on the other side may be configured to perform and/or maintain the following functionality:

1. Log message format: <LogTime><verbosity><string_format><param values>
2. Send message to management process 1006 using message queue handle.
3. Non-blocking call The Security Policies Database 1012 is a highly scalable structure which is designed for high speed searching of policies, as well as high speed insertion and deletion of policies, and includes hash-based keys for each policy. The hash-based hash_key and bucket structure are used to arrange and store policies for selected applications. The hashing is based on SIP in one embodiment. The Security Policies Database 1012 may add, delete, modify, and search policies functions. When seed_secure_signature is modified, the Security Policies Database 1012 triggers a change in the secure_signature for the corresponding session in the Socket Descriptor Database 1014.

The Socket Descriptor Database 1014 includes a list of all registered data sockets with associated data socket descriptors, DIP, base keys, and a latest key for transmission. Policy functions may be added, deleted, modified, and searched within the Socket Descriptor Database 1014. When the seed_secure_signature is modified, the Socket Descriptor Database 1014 may trigger a change in the secure_signature for any corresponding data sockets in the Socket Descriptor Database 1014.

Each Data Socket Descriptor Record stored in the Socket Descriptor Database 1014 may include any of the following attributes: port number, peer IP address, peer port number, receive buffer size, transmit buffer size, peer ID1, and peer ID2. Each Data Socket Descriptor Record may also include the statistical record (Stats_rec). The Stats_rec includes a count of the total number of payloads received, a total number of payloads transmitted, a number of bytes received, a number of bytes transmitted, and a number of rejected payloads (i.e., policy discards, secure signature mismatch discards, ID1 mismatch discards, ID2 mismatch discards, and legacy discards including other details).

The Peer Security Profile is listed with the Data Socket Descriptor Record. The Local Security Profile is also listed in the Data Socket Descriptor Record. In addition, the Data Socket Descriptor Record may also include the local secure signature record and the peer secure signature record. Base Signature indicates that the Security Signature includes the base signature as a seed.

The packet options processor is configured to provide packet processing, and may include some or all of the following functionality: packet receive processing, reading data socket options, keys processing per security policies, security profile processing per security policies, finding violations and updating keys, and updating logs.

According to one embodiment, a Management Process Initialization Sequence may include initialization of the log message queues, i.e., the messaging-based IPC. Next, the Remote Procedure Call (RPC) interface or the communication interface with the external block called the policy orchestrator is initialized on the management port IP interface. It can also use a data port interface for communication when so configured. On this interface, the management process receives and sends messages from/to the policy orchestrator, including the sending and receiving of configuration messages. The health status of the application structure is initialized and checked. The process waits for a registration message from the target application ADPL. A list is maintained of all application instances. A new application registration is forwarded to the policy orchestrator. Then, the Management Process receives the configuration from the policy orchestrator. The Management Process applies the configuration to the ADPL of the target application.

Figure 11:
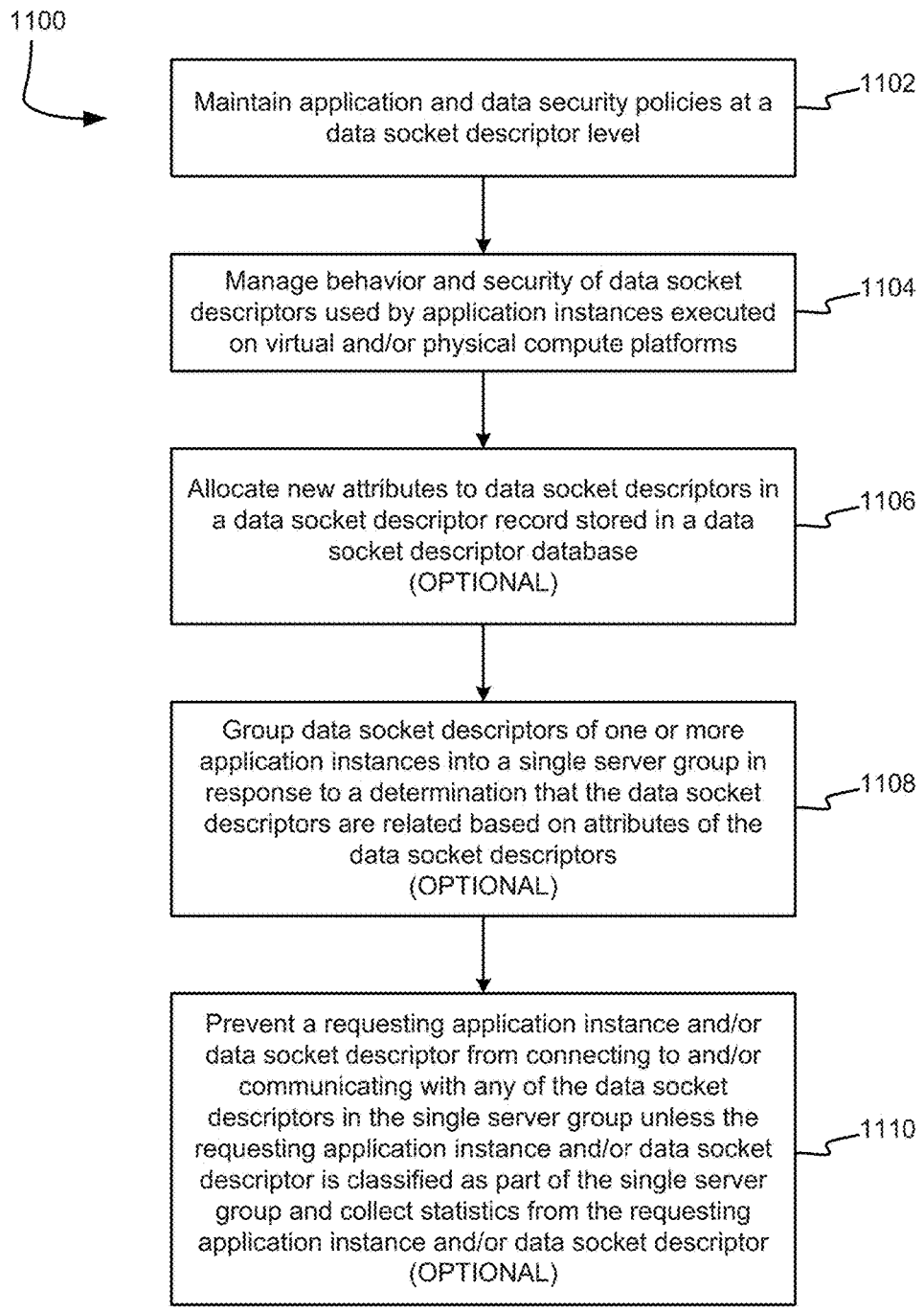
FIG. 11 shows a flowchart of a method, according to one embodiment.

Now referring to FIG. 11, a flowchart of a method 1100 is shown according to one embodiment. The method 1100 may be performed in accordance with the present invention in any of the environments depicted in FIGS. 1-10, among others, in various embodiments. Of course, more or less operations than those specifically described in FIG. 11 may be included in method 1100, as would be apparent to one of skill in the art upon reading the present descriptions.

Each of the steps of the method 1100 may be performed by any suitable component of the operating environment. For example, in various embodiments, the method 1100 may be partially or entirely performed by a server, host, computing system, processor, switch, or some other device having one or more processing units therein. The processing unit, e.g., processing circuit(s), chip(s), and/or module(s) implemented in hardware and/or software, and preferably having at least one hardware component, may be utilized in any device to perform one or more steps of the method 1100. Illustrative processing units include, but are not limited to, a central processing unit (CPU), an ASIC, a FPGA, etc., combinations thereof, or any other suitable computing device known in the art.

As shown in FIG. 11, method 1100 may initiate with operation 1102, where application and data security policies are maintained at a data socket descriptor level. These security policies may be stored in a security policy database, and may be accessed by an ADPL in protecting an application instance and/or data for the application instance.

In operation 1104, behavior and security of data socket descriptors is managed. The data socket descriptors are used by application instances executed on virtual and physical compute platforms (hypervisors, servers, hosts, processors, etc.) within a particular field of deployment, such as a data center, as a product or server in the IOT, within industrial controls at a processing or manufacturing plant, in a military application, in an intelligence-gathering or analysis application, onboard sea-faring vessels such as navy ships and submarines, onboard air-faring vessels such as strike fighter planes, strategic bombers, satellites, commercial airliners, etc.

In optional operation 1106, new attributes are allocated to data socket descriptors in a data socket descriptor record stored in a data socket descriptor database as these new attributes are discovered and/or generated.

In optional operation 1108, data socket descriptors of one or more application instances are grouped together into a single server group in response to a determination that the data socket descriptors are related based on attributes of the data socket descriptors.

In optional operation 1110, a requesting application instance and/or data socket descriptor may be prevented, restricted, or otherwise foiled from connecting to and/or communicating with any of the data socket descriptors in the single server group unless the requesting application instance and/or data socket descriptor is classified as part of the single server group. In a further embodiment, statistics may be collected from the requesting application instance and/or data socket descriptor, such as those described herein in various embodiments.

The data socket descriptors may include any Operating System (OS) attributes available, mathematical attributes such as a secure source signature, behavioral attributes such as use patterns, past use, anticipated use, etc., and one or more proprietary attributes, such as ID1, ID2, etc.

In one embodiment, the attributes of the data socket descriptors may include a secure base signature per data socket descriptor and a secure runtime signature per data socket descriptor. Moreover, ID1, ID2, and an application name may be used as attributes. In a further embodiment, standard data socket descriptor attributes may be utilized from the OS, alone or in conjunction with the attributes described above, such as a server and/or source IP interface, a server port number, a number of waiting connections allowed, and an application packet buffer size for transmitting and receiving packets.

According to one embodiment, the security policies may be applied to an individual data socket descriptor or a group of data socket descriptors grouped together based upon common attributes thereof, along with each data socket descriptor of the group.

In one approach, the security policies may dictate an action to perform based on a security profile received for each individual data socket descriptor. This action to perform may be selected from: allow, allow-and-analyze, drop, and drop-and-analyze.

In a further approach, the security policies may dictate a sub-action to perform based on the action and the security profile received for each individual data socket descriptor. This sub-action to perform may be selected from: mirror ingress and egress payloads, apply a redaction policy, log an event, generate a trap, flush a cache data, lock processor memory, lock an in-memory database, and lock rows and/or columns of the in-memory database.

In another embodiment, method 1100 may include attaching a unique secure key generator module to each data socket descriptor. Moreover, the method may include inserting a uniquely generated secure key to each individual payload sent via an associated data socket descriptor. These uniquely generated secure keys are used to verify the authenticity of incoming payloads based on inclusion of and verification of an included secure key in the incoming payload, in one approach.

Method 1100 may be implemented as a system, process, or a computer program product. As a system, method 1100 may be implemented on the first host and/or the second host as logic configured to perform method 1100, along with being implemented on any other hosts on which secure communications are desired. As a computer program product, a computer readable storage medium may store program instructions configured to perform method 1100.

For example, a system may include a processing circuit and logic integrated with and/or executable by the processing circuit. The processing circuit is a non-transitory hardware device configured to execute logic embedded therein, or provided thereto. Examples of processing circuits include, but are not limited to, CPUs, ASICs, FPGAs, microprocessors, integrated circuits, etc. The logic is configured to cause the processing circuit to perform method 1100, in one embodiment.

In another example, a computer program product may include a computer readable storage medium having program instructions stored thereon. The computer readable storage medium is a non-transitory device configured to store program instructions that are executable and/or readable by a processing circuit. The program instructions are executable by a processing circuit to cause the processing circuit to perform method 1100 in one embodiment.

Variations of the systems, methods, and computer program products described herein are also possible, and the explicit description thereof in this document is not required in order to provide those of skill in the art with the ability to conceive of such variations when reading the present descriptions.

What is claimed is:

1. A system, comprising:
   a processing circuit and logic integrated with and/or executable by the processing circuit, wherein the logic causes the processing circuit, upon execution of the logic, to:
      maintain a plurality of application protection policies and a plurality of data protection policies in a security policies database surrounded by an application and data protection layer (ADPL), wherein the ADPL:
         accesses the application protection policies to protect a plurality of application instances being executed on a compute platform from malicious attack, using one or more security features of the compute platform; and
         accesses the data protection policies to protect data being used by the plurality of application instances from malicious attack using one or more of the security features of the compute platform;
      implement the plurality of application protection policies at a data socket descriptor level, wherein each respective one of the application protection policies is associated, via a corresponding data socket descriptor, with either: a different one of the plurality of application instances, or a different group of the plurality of application instances;
      implement the plurality of data protection policies at the data socket descriptor level, wherein each respective one of the data protection policies is associated, a corresponding data socket descriptor, with either: data corresponding to a different one of the plurality of application instances, or data corresponding to a different group of the plurality of application instances;
      manage, using the application protection policies and the data protection policies, a behavior and a security of a plurality of data socket descriptors used by the plurality of application instances;
      allocate new attributes to data socket descriptors in a data socket descriptor record stored in a data socket descriptor database;
      group data socket descriptors of one or more application instances into a single server group in response to a determination that the data socket descriptors are related based on various attributes of the data socket descriptors, the data socket descriptors comprising a secure base signature per data socket descriptor and a secure runtime signature per data socket descriptor;
      prevent a requesting application instance and/or corresponding data socket descriptor from connecting to and/or communicating with any of the other data socket descriptors in the single server group unless the requesting application instance and/or corresponding data socket descriptor is classified as part of the single server group; and
      collect statistics from the requesting application instance and/or corresponding data socket descriptor;
   wherein the attributes of the data socket descriptors further comprise:
      a server and/or source internet protocol (IP) interface;
      a server port number;
      a number of waiting connections allowed; and
      an application packet buffer size for transmitting and receiving packets;
   wherein the application protection policies facilitate the plurality of application instances selecting the one or more security features of the compute platform;
   wherein the one or more security features of the compute platform are selected from the group consisting of: a dynamic cache flush procedure, a dynamic data redaction procedure, and a memory database locking procedure; and
   wherein the one or more security features are each applied on a per application instance, per session, basis.

2. The system as recited in claim 1, wherein the application protection policies are selected from the group consisting of: east-west policies, and north-south policies;
   wherein the east-west policies govern traffic between internal servers of the compute platform;
   wherein each east-west packet on individual data sockets of the compute platform is marked with a unique secure source signature;
   wherein the north-south policies govern traffic between internal servers of the compute platform and external clients and/or servers; and
   wherein data socket descriptors governed by the north-south policies allow packets without options or signatures.

3. The system as recited in claim 1, wherein the application protection policies and the data protection policies each independently dictate an action to perform based on a security profile received for each individual data socket descriptor, the action being selected from the group consisting of: allow, allow-and-analyze, drop, and drop-and-analyze.

4. The system as recited in claim 3, wherein the application protection policies and the data protection policies each independently facilitate performing a sub-action based on the action and the security profile received for each individual data socket descriptor, the sub-action being selected from the group consisting of: mirror ingress and egress payloads, apply a redaction policy, log an event, generate a trap, flush a cache data, lock processor memory, lock an in-memory database, and lock rows and/or columns of the in-memory database.

5. The system as recited in claim 1, wherein the logic further causes the processing circuit to:
   apply the application protection policies and the data protection policies to the corresponding data socket descriptors during a runtime of the plurality of application instances;
   attach a unique secure key generator module to each data socket descriptor;
   insert a uniquely generated secure key to each individual payload sent via an associated data socket descriptor; and
   verify authenticity of incoming payloads based on inclusion of a secure key.

6. A computer-implemented method, comprising:
maintaining a plurality of application protection policies and a plurality of data protection policies in a security policies database surrounded by an application and data protection layer (ADPL), wherein the ADPL:
   accesses the application protection policies to protect a plurality of application instances being executed on a compute platform from malicious attack, using one or more security features of the compute platform; and
   accesses the data protection policies to protect data being used by the plurality of application instances from malicious attack, using one or more of the security features of the compute platform; and the method further comprising
implementing the plurality of application protection policies at a data socket descriptor level, wherein each respective one of the application protection policies is associated, via a corresponding data socket descriptor, with either: a different one of the plurality of application instances, or a different group of the plurality of application instances;
implementing the plurality of data protection policies at the data socket descriptor level, wherein each respective one of the data protection policies is associated, via a corresponding data socket descriptor, with either: data corresponding to a different one of the plurality of application instances, or data corresponding to a different group of the plurality of application instances;
applying the application protection policies and the data protection policies to the corresponding data socket descriptors during a runtime of the plurality of application instances; and
managing, using the application protection policies and the data protection policies, a behavior and a security of the data socket descriptors used by the plurality of application instances;
allocating new attributes to data socket descriptors in a data socket descriptor record stored in a data socket descriptor database;
grouping data socket descriptors of one or more application instances into a single server group in response to a determination that the data socket descriptors are related based on various attributes of the data socket descriptors, the data socket descriptors comprising a secure base signature per data socket descriptor and a secure runtime signature per data socket descriptor;
preventing a requesting application instance and/or data socket descriptor from connecting to and/or communicating with any of the data socket descriptors in the single server group unless the requesting application instance and/or data socket descriptor is classified as part of the single server group; and
collecting statistics from the requesting application instance and/or data socket descriptor,
wherein the attributes of the data socket descriptors further comprise:
   a server and/or source internet protocol (IP) interface;
   a server port number;
   a number of waiting connections allowed; and
   an application packet buffer size for transmitting and receiving packets;
wherein the application protection policies facilitate the plurality of application instances selecting the one or more security features of the compute platform;
wherein the one or more security features of the compute platform are selected from the group consisting of: a dynamic cache flush procedure, a dynamic data redaction procedure, and a memory database locking procedure; and
wherein the one or more security features are each applied on a per application instance, per session, basis.

7. The method as recited in claim 6, wherein the application protection policies are selected from the group consisting of: east-west policies, and north-south policies;
wherein the east-west policies govern traffic between internal servers of the compute platform;
wherein each east-west packet on individual data sockets of the compute platform is marked with a unique secure source signature;
wherein the north-south policies govern traffic between internal servers of the compute platform and external clients and/or servers; and
wherein data socket descriptors governed by the north-south policies allow packets without options or signatures.

8. The method as recited in claim 6, wherein the application protection policies and the data protection policies each independently dictate an action to perform based on a security profile received for each individual data socket descriptor, the action being selected from the group consisting of: allow, allow-and-analyze, drop, and drop-and-analyze.

9. The method as recited in claim 8, wherein the application protection policies and the data protection policies each independently facilitate the plurality of application instances performing a sub-action based on the action and the security profile received for each individual data socket descriptor, the sub-action being selected from the group consisting of: mirror ingress and egress payloads, apply a redaction policy, generate a trap, flush a cache data, lock processor memory, lock an in-memory database, and lock rows and/or columns of the in-memory database.

10. The method as recited in claim 6, further comprising:
attaching a unique secure key generator module to each data socket descriptor;
inserting a uniquely generated secure key to each individual payload sent via an associated data socket descriptor; and
verifying authenticity of incoming payloads based on inclusion of a secure key.

11. A computer program product, comprising a computer readable storage medium having program instructions stored thereon, the program instructions being executable by a processing circuit to cause the processing circuit to:
maintain a plurality of application protection policies and a plurality of data protection policies in a security policies database surrounded by an application and data protection layer (ADPL), wherein the ADPL:
   accesses the application protection policies to protect a plurality of application instances being executed on a compute platform from malicious attack, using one or more security features of the compute platform; and
   accesses the data protection policies to protect data being used by the plurality of application instances from malicious attack using one or more of the security features of the compute platform;
implement a plurality of application protection policies at a data socket descriptor level, wherein each respective one of the application protection policies is associated, via a corresponding data socket descriptor, with either:

a different one of a plurality of application instances, or a different group of the plurality of application instances;

implement a plurality of data protection policies at the data socket descriptor level, wherein each respective one of the data protection policies is associated, via a corresponding data socket descriptor, with either: data corresponding to a different one of the plurality of application instances, or data corresponding to a different group of the plurality of application instances;

apply the application protection policies and the data protection policies to the corresponding data socket descriptors during a runtime of the plurality of application instances;

manage, using the application protection policies and the data protection policies, a behavior and a security of a plurality of data socket descriptors used by the plurality of application instances;

allocate new attributes to data socket descriptors in a data socket descriptor record stored in a data socket descriptor database;

group data socket descriptors of one or more application instances into a single server group in response to a determination that the data socket descriptors are related based on various attributes of the data socket descriptors, the data socket descriptors comprising a secure base signature per data socket descriptor and a secure runtime signature per data socket descriptor;

prevent a requesting application instance and/or corresponding data socket descriptor from connecting to and/or communicating with any of the other data socket descriptors in the single server group unless the requesting application instance and/or corresponding data socket descriptor is classified as part of the single server group; and collect statistics from the requesting application instance and/or corresponding data socket descriptor;

wherein the attributes of the data socket descriptors further comprise:

a server and/or source internet protocol (IP) interface;

a server port number;

a number of waiting connections allowed; and an application packet buffer size for transmitting and receiving packets;

wherein the application protection policies facilitate the plurality of application instances selecting the one or more security features of the compute platform;

wherein the one or more security features of the compute platform are selected from the group consisting of: a dynamic cache flush procedure, a dynamic data redaction procedure, and a memory database locking procedure; and wherein the one or more security features are each applied on a per application instance, per session, basis.

12. The computer program product as recited in claim 11, wherein the application protection policies and the data protection policies are applied to an individual data socket descriptor or a group of data socket descriptors grouped together based upon common attributes thereof, and wherein the application protection policies and the data protection policies each independently dictate an action to perform based on a security profile received for each individual data socket descriptor, the action being selected from the group consisting of: allow, allow-and-analyze, drop, and drop-and-analyze.

13. The computer program product as recited in claim 12, wherein the application protection policies and the data protection policies each independently facilitate the plurality of application instances performing a sub-action based on the action and the security profile received for each individual data socket descriptor, the sub-action being selected from the group consisting of: mirror ingress and egress payloads, apply a redaction policy, log an event, generate a trap, flush a cache data, lock processor memory, lock an in-memory database, and lock rows and/or columns of the in-memory database.

14. The computer program product as recited in claim 11, wherein the program instructions further cause the processing circuit, upon execution by the processing circuit, to:

attach a unique secure key generator module to each data socket descriptor;

insert a uniquely generated secure key to each individual payload sent via an associated data socket descriptor; and verify authenticity of incoming payloads based on inclusion of a secure key.

* * * * *